United States Patent [19]

Hoff

[11] 4,335,585

[45] Jun. 22, 1982

[54] LAWN TRIMMER CONSTRUCTION

[75] Inventor: Stephen J. Hoff, Richmond, Ind.

[73] Assignee: Hoffco, Inc., Richmond, Ind.

[21] Appl. No.: 110,125

[22] Filed: Jan. 7, 1980

Related U.S. Application Data

[62] Division of Ser. No. 871,603, Jan. 23, 1978, Pat. No. 4,188,719.

[51] Int. Cl.$^3$ .................... F16C 1/02; A01D 35/26
[52] U.S. Cl. ........................... 464/52; 56/12.7; 30/276; 464/173; 464/177; 464/178
[58] Field of Search ............... 64/2 R, 4, 3, 1 S; 56/12.7, 17.5, 295; 30/276, 500

[56] References Cited

U.S. PATENT DOCUMENTS

| | | | |
|---|---|---|---|
| 1,926,999 | 9/1933 | Keller | 64/2 R |
| 3,219,129 | 11/1965 | Yamada | 64/4 |
| 3,785,752 | 1/1974 | Crespo | 64/2 R |
| 3,826,068 | 7/1974 | Ballas et al. | 56/12.7 |
| 3,977,078 | 8/1976 | Pittinger, Jr. | 56/12.7 |
| 4,126,928 | 11/1978 | Hoff | 64/2 R |
| 4,148,141 | 4/1979 | Hoff | 30/276 |
| 4,226,021 | 10/1980 | Hoff | 64/2 R |

FOREIGN PATENT DOCUMENTS 45-38281  12/1970  Japan ................... 64/2 R

*Primary Examiner*—Charles J. Myhre
*Assistant Examiner*—Magdalen Moy
*Attorney, Agent, or Firm*—Jenkins, Coffey, Hyland, Badger & Conard

[57] ABSTRACT

A lawn trimmer has a tubular shaft assembly which structurally and drivingly connects an upper power head to a lower rotary tool head in a lawn-trimming tool. The assembly includes a bent portion to dispose its opposite ends at an angle to each other, and comprises an outer frame shaft of relatively large diameter and structural strength and an inner sheath tube of relatively smaller diameter formed of rigid but bendable tubing extending coaxially of the frame tube. The sheath tube is supported over the bent length of the assembly by a continuous semirigid bushing, and its lower end is held coaxial with the lower end of the frame tube by a substantially rigid bushing. The lower end of the frame tube, beyond such rigid bushing, is expanded to form a sleeve of enlarged diameter and predetermined length, and an arbor assembly is mounted in such sleeve and consists of a pair of ball bearings mounted by their inner races on the arbor and having their outer races supportingly received in the sleeve. The outer end of the sleeve is deformed inward to secure the outer races of the spaced ball bearings between themselves and the upper end of the enlargement.

8 Claims, 4 Drawing Figures

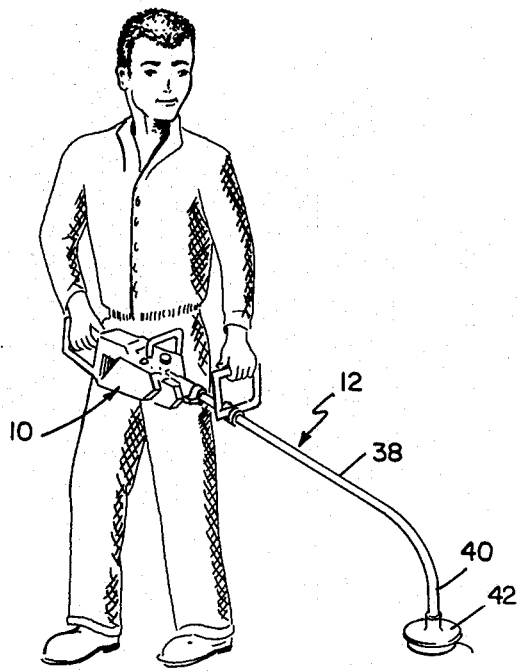
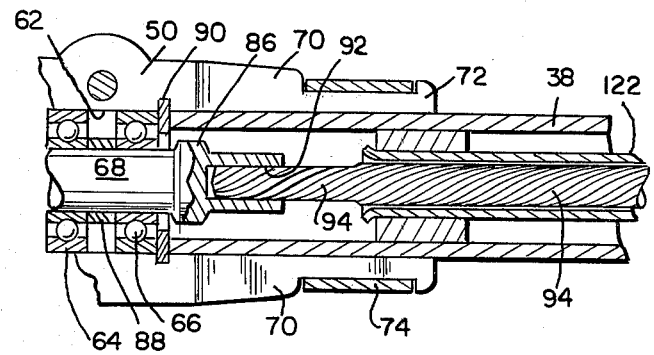
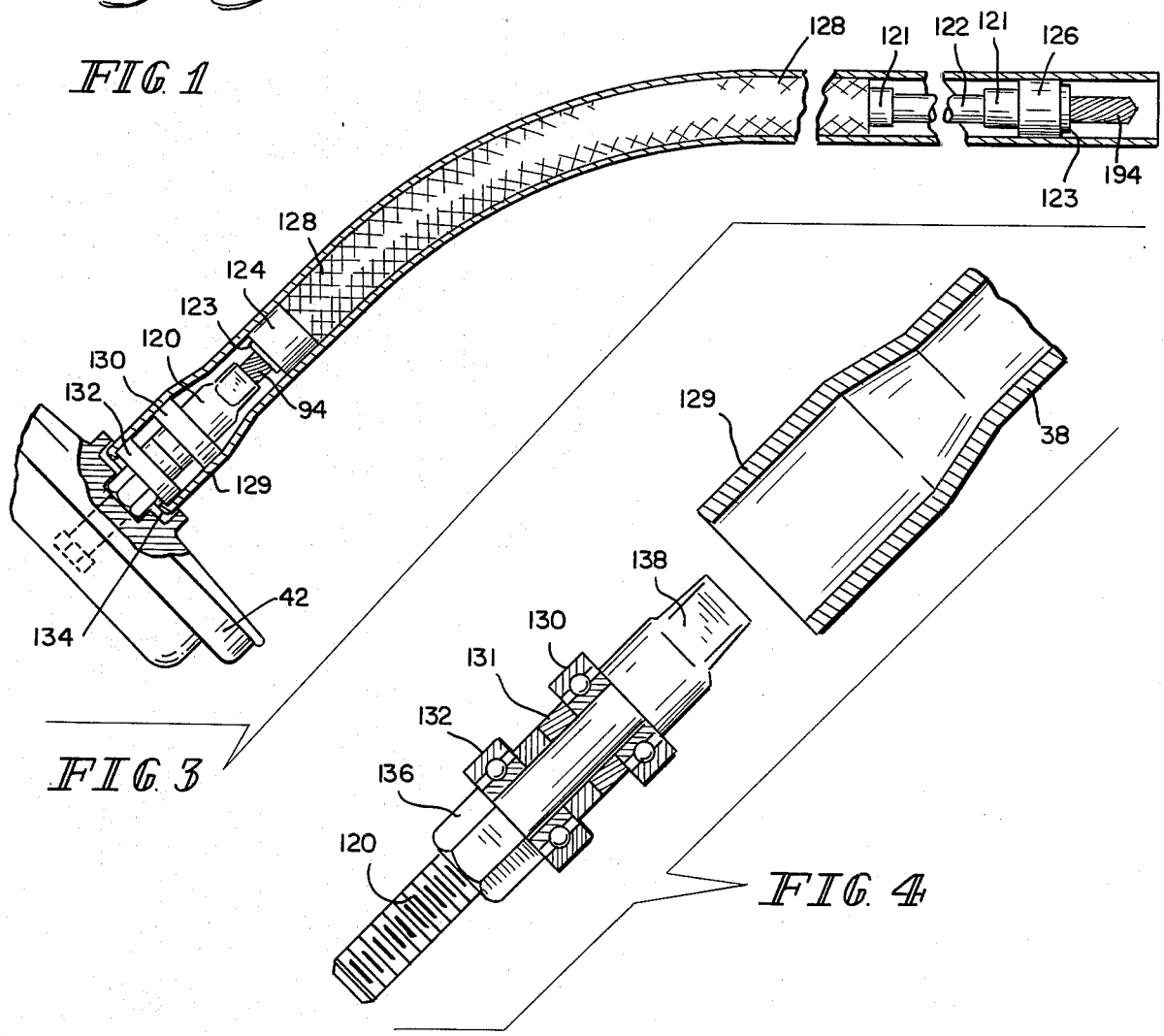

LAWN TRIMMER CONSTRUCTION

This application is a division of application Ser. No. 871,603, filed Jan. 23, 1978, and now Pat. No. 4,188,719, dated Feb. 19, 1980, and entitled LAWN TRIMMER CHAIN SAW ATTACHMENT.

This invention relates to a lawn trimmer, brush cutter, or the like in which an upper power head is connected to a lower rotary tool head by a tubular shaft assembly which includes an outer frame shaft and an inner drive shaft which rotates in a sheath tube of substantially smaller diameter than the frame shaft.

In use, such power tools are carried manually by handle means adjacent their upper ends and near the relatively heavy power head. The lower tool head is thus disposed at the far end of the relatively long tubular shaft assembly and at a considerable distance from the handle means. To facilitate its use, and to reduce the effort required to hold it and manipulate it in its desired operating position, the lower end of the assembly should desirably be of low weight, yet must be of strong and durable construction. The present invention provides a mounting structure for the lower tool head of strong and durable construction which is also of light weight and inexpensive to manufacture.

In accordance with the invention, the tubular shaft assembly which structurally and drivingly connects the upper power head to the lower tool head comprises an outer frame shaft of relatively large diameter and structural strength and an inner sheath tube of relatively smaller diameter formed of rigid but bendable tubing and held substantially coaxial with the frame tube by bushing means. It is usually desirable that the shaft assembly include a bent portion to dispose its opposite ends at an angle to each other, and in such case, the inner sheath tube is desirably held coaxial with the frame tube over the bent portion by a continuous bushing means of semirigid material such as a length of thick-walled tubing of semirigid plastic material, and the lower end of the inner sheath tube is desirably held coaxial with the lower end of the frame tube by a short rigid bushing as of metal. The lower end portion of the frame tube, beyond such lower rigid bushing, is expanded to form a sleeve of enlarged diameter and predetermined length, integrally connected to the main length of the frame tube by a tapered portion which in effect defines the inner end of the enlarged sleeve. An arbor assembly is mounted in such sleeve and has outer stationary bearing means supported in the sleeve and has a rotatable inner bearing means which supports a rotatable arbor in coaxial alignment with the lower end of the sheath tube. The outer end of the enlarged frame shaft sleeve is deformed inward, as by rolling its edge inward, to secure the outer stationary bearing means in place in the sleeve, fixed between such edge and the inner end of the sleeve. The lower rotating tool is directly mounted on the arbor and is desirably driven by a non-circular unit on the arbor.

The accompanying drawings illustrate the invention and show an embodiment exemplifying the best mode of carrying out the invention as presently perceived. In such drawings:

FIG. 1 is a pictorial view showing a preferred embodiment of the invention being manually carried and used by an operator, as for lawn trimming;

FIG. 2 is a longitudinal sectional view taken in the plane of separation of two halves of a housing by which the power head is attached to the upper end of the frame shaft assembly;

FIG. 3 is a longitudinal sectional view of the frame shaft and the lower end assembly of the lawn trimmer shown in FIGS. 1 and 2; and FIG. 4 is an enlarged exploded view showing the mounting of the arbor shaft for the cutter head in the lower end of the frame tube.

The lawn trimmer shown in the drawings comprises a power head 10 attached to the upper end of a frame shaft assembly 12 including a frame tube 38, the lower end 40 of which carries a rotary cutter head 42 which is rotatably driven by a flexible drive shaft extending through the frame tube 38 as more fully explained below. As more fully explained in parent application Ser. No. 871,603, the power head shown is that from a chain saw and is fitted with a bevel gear case by which it is connected to the shaft assembly 12, but the present invention may be used with other power heads. The shaft assembly 12 carries a D-shaped handle 44.

The power head assembly terminates at its forward end in a generally tubular portion, here shown as formed by two generally semicylindrical casting portions 50 shaped to form semicylindrical seats 62 for ball bearings 64 and 66 which support an output shaft 68. Each casting also has a semicylindrical extension 70 having an internal surface coaxial with the seat 62. Over an outer portion of each extension 70, its diametric face is slightly cut away from the separation plane of the two casting portions 50 so that the two semicylindrical extensions form a split sleeve 72 adapted to receive the upper end of the frame tube 38, as shown in FIG. 2. The two halves of the split sleeve 72 are surrounded by a steel strap clamp 74. The output shaft 68 is formed with an outer end portion 86 which defines a shoulder at its inner end for abutment by the inner race of the bearing 66. A thrust ring 90 is set in a groove in the two casting portions at the outer face of the bearing 66 to form an abutment for the outer race of that bearing. The outer end of the output shaft 68 is formed with a square socket 92 for the reception of the squared end of a flexible drive shaft 94 mounted in the shaft tube 38 and extending into driving engagement with the rotary cutter head 42 as more fully explained below.

As shown in FIGS. 2 and 3, the flexible drive shaft 94 extends from the output shaft 68 of the power head coaxially through the frame tube 38 to an arbor shaft 120 mounted at the lower end of the frame tube 38. To support the flexible shaft 94, a sheath tube 122 is mounted concentrically within the frame tube 38. The assembly of the sheath tube 122 and the frame tube 38 is desirably made in accordance with the teachings of my prior application Ser. No. 788,357, filed Apr. 18, 1977, now U.S. Pat. No. 4,126,928. A straight length of sheath tube 122 is first assembled with a lower end spacer or bushing 124, an upper end spacer or bushing 126, and a length of thick-walled plastic tubing 128 sufficient to form a continuous spacer extending from the lower spacer 124 upward through the bent portion of the frame tube 38 and over a considerable length of the straight portion thereof to provide support for the straight portion of the sheath tube 122. The spacers may be held temporarily in place with wrappings of tape 121. The ends of the sheath tube 122 are then flared to form retaining flanges 123 at the outer faces of the end spacers 124 and 126. This assembly is then inserted in a straight length of frame tube, and the resulting assembly is then bent to the configuration shown in the drawings.

For purposes of mounting the arbor shaft 120 in the lower end of the frame tube 38, such lower end is expanded to form a sleeve 129 to a size sufficient to receive an arbor assembly. The arbor assembly comprises the arbor shaft 120 which has an enlarged upper end defining a shoulder. Two ball bearings 130 and 132 are mounted on the shaft, with the inner race of the bearing 130 abutting against the shoulder on the shaft and with the inner races of the two bearings held in spaced relation by a spacer 132. An elongated hex nut 136 is threaded on the projecting end of the arbor shaft 120 and against the inner race of the bearing 132 to clamp the two bearings and the spacer 130 between itself and the shoulder on the shaft. This arbor assembly is inserted into the expanded lower end 129 of the frame tube 38, and the end edge of the tube is then rolled inward to form a retaining flange 134 against the outer face of the outer race of the bearing 132.

The hexagonal nut 136 on the arbor shaft forms a non-circular drive section which fits into a mating socket in the hub of the rotating cutter head 42 to provide a driving connection between the arbor shaft 120 and that rotary head 42. Such head is desirably as shown in my U.S. Pat. No. 4,148,141 of Apr. 10, 1979, which was co-pending with the application of which this is a division. The upper end of the arbor shaft 120 is formed with a square socket 138 to receive the squared lower end of the flexible drive shaft 94. Such shaft 94 is insertable into the sheath tube 122 from the upper end of the frame shaft assembly, before the frame tube is inserted into the split sleeve 72 to its mounted position as shown in FIG. 2.

The frame shaft and lower arbor assembly is especially adapted and advantageous for use in lawn trimmers in which the rotary tool is a relatively lightweight cutter head of the type which uses one or more flexible monofilament lines as cutting elements, although it is also adapted for use with other rotary tools. It provides an especially compact and lightweight construction at the remote end of the shaft assembly, which is advantageously combined with a shaft assembly of bent construction as shown, which is easy to manufacture, especially in that combination, and which provides a sturdy and long-lived mounting support for the lower arbor and the rotary tool carried thereby.

I claim:

1. A tubular shaft assembly for structurally and drivingly connecting an upper power head to a lower tool head in a lawn trimming tool or the like, said assembly including a bent portion to dispose its opposite ends at an angle to each other, comprising an outer frame shaft of relatively large diameter and structural strength, an inner sheath tube of relatively smaller diameter formed of rigid but bendable tubing and disposed substantially coaxially of the frame tube, bushing means interposed between the two tubes to support the inner sheath tube from and in fixed relation with the outer frame tube with the ends of the sheath tube parallel with the axis of the frame tube, the frame tube having a lower end portion projecting beyond the end of the sheath tube and expanded to form a sleeve of enlarged diameter and predetermined length joined to the frame tube by an integral expansion section, an arbor assembly mounted in said sleeve and having outer stationary bearing means in locating engagement with said expansion section and having an arbor bearing rotatably mounted in such means in coaxial alignment with the lower end of the sheath tube, the outer end of said frame shaft sleeve being deformed inward to secure the stationary bearing means in place in the sleeve and against said expansion section.

2. A shaft assembly as in claim 1 in which said arbor assembly comprises an arbor shaft, a pair of ball bearings having inner races fixed in spaced relation on said shaft and having outer races for rotatably supporting the inner races, said outer races forming said outer stationary bearing means and being fixed in said enlarged sleeve at the end of the frame tube, by and between the expansion section of such sleeve and the inward deformed outer end of such sleeve.

3. A tubular shaft assembly for structurally and drivingly connecting an upper power head to a lower rotary tool head in a lawn-trimming tool or the like, comprising an outer frame shaft tube of relatively large diameter and structural strength, an inner sheath tube of relatively smaller diameter, bushing means interposed between the two tubes, including a bushing supporting the lower end of the sheath tube in axial alignment with the frame tube, the frame tube having a lower end portion projecting beyond the end of the sheath tube and expanded to form a sleeve of enlarged diameter and predetermined length integrally joined to the frame tube by an expansion section, an arbor assembly mounted in said sleeve and having outer stationary bearing means, and an arbor rotatably mounted in said bearing means in coaxial alignment with the lower end of the sheath tube, the outer bearing means of the arbor assembly having an inner end face in opposed relation with said expansion section and said bearing means having an outer end face, the end of the sleeve being deformed inward against such outer end face, so that such outer bearing means is held fixed between such expansion section and the inward deformed end of the sleeve.

4. A tubular shaft assembly as in claim 3 in which the arbor has a non-circular socket in its inner end, with the addition of a flexible drive shaft mounted in the sheath tube and having a non-circular end engaged in said socket.

5. A tubular shaft assembly for structurally and drivingly connecting an upper power head to a lower rotary tool head in a lawn-trimming tool or the like, comprising an outer frame shaft tube of relatively large diameter and structural strength, an inner sheath tube of relatively smaller diameter, bushing means interposed between the two tubes, including a bushing supporting the lower end of the sheath tube in axial alignment with the frame tube, the frame tube having a lower end portion projecting beyond the end of the sheath tube and expanded to form a sleeve of enlarged diameter and predetermined length, an arbor assembly mounted in said sleeve and comprising an arbor, a pair of roller bearings having inner races mounted in fixed spaced relation on the arbor, the roller bearings also having outer races forming outer bearing means and fixedly mounted in the expanded sleeve of the shaft tube in coaxial alignment with the lower end of the sheath tube, said expanded sleeve being integrally joined to the frame tube by a conical section, the outer bearing means of the arbor assembly having an end face in opposed relation with said conical section, and said bearing means having an outer end face, the end of the sleeve being deformed inward against such outer end face, so that such outer bearing means is held fixed between such conical section and the inward deformed end of the sleeve.

6. A tubular shaft assembly as in claim 5 in which the roller bearings are ball bearings, the arbor has a shoulder at its inner end, the inner races are held in spaced relation by one or more spacers on the arbor therebetween and are held on the arbor and against the shoulder by a non-circular nut threaded on the arbor.

7. A tubular shaft assembly as in claim 5 in which said arbor has connector means at its inner end for axially separable connection with a drive shaft in said shaft tube and has an outward-facing shoulder at its inner end, the inner races of said roller bearings are held in spaced relation by spacing means on the arbor therebetween and are held on the arbor and against said shoulder by a non-circular nut threaded on the arbor.

8. A tubular shaft assembly as in claims 6 or 7 with the addition of a rotary tool mounted on the arbor and having a non-circular seat engaged over the nut so as to be rotatably driven thereby.

* * * * *